No. 782,763. PATENTED FEB. 14, 1905.
J. G. SHUSTER.
TIRE SHRINKER.
APPLICATION FILED FEB. 26, 1904.
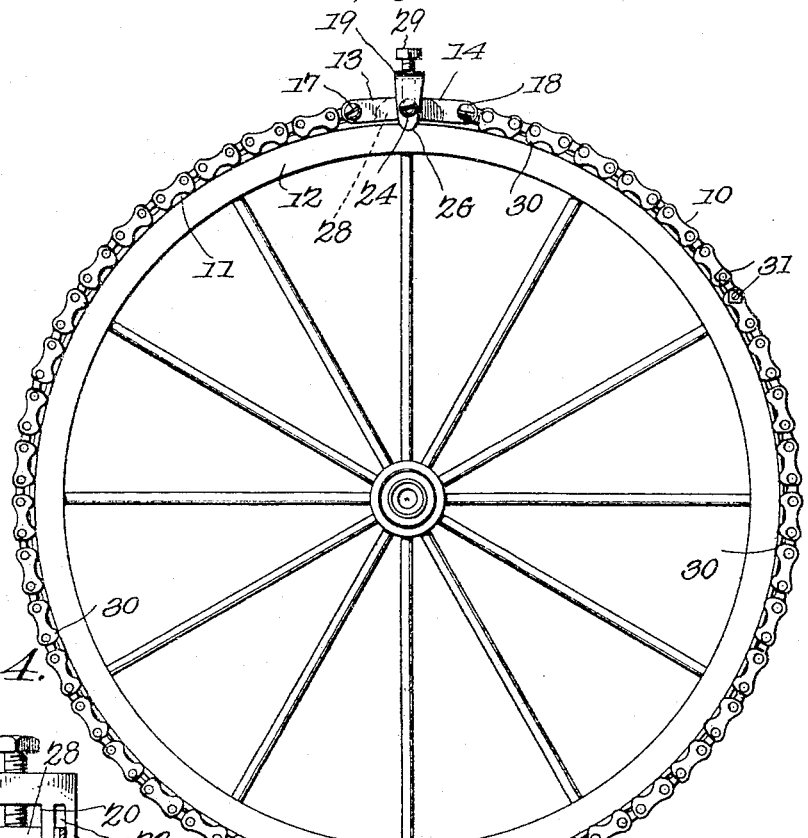
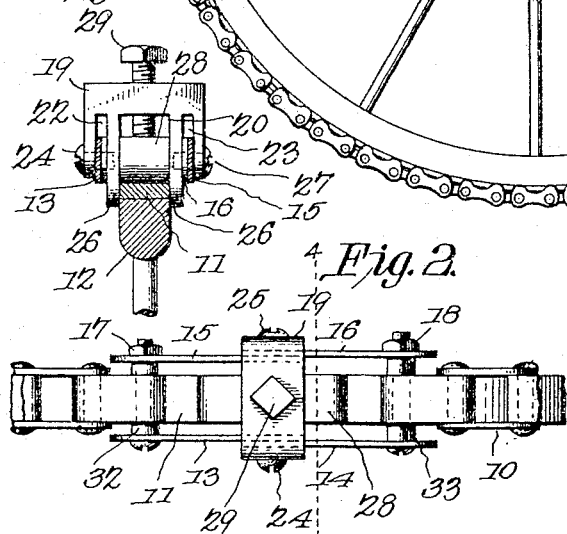
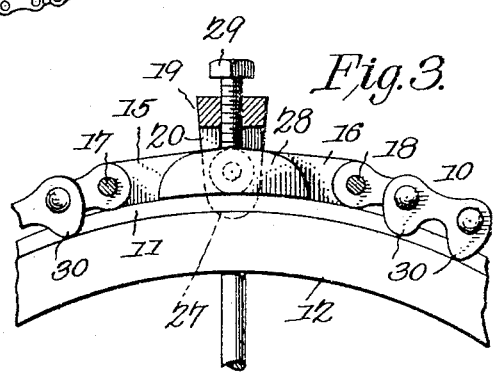
Witnesses
E. J. Stewart
C. N. Woodward
John G. Shuster, Inventor.
by C. A. Snow & Co.
Attorneys No. 782,763.

Patented February 14, 1905.

UNITED STATES PATENT OFFICE.

JOHN G. SHUSTER, OF CHICKASHA, INDIAN TERRITORY.

TIRE-SHRINKER.

SPECIFICATION forming part of Letters Patent No. 782,763, dated February 14, 1905.

Application filed February 26, 1904. Serial No. 195,460.

*To all whom it may concern:*

Be it known that I, JOHN G. SHUSTER, a citizen of the United States, residing at Chickasha, in the county of Pickens, Indian Territory, have invented a new and useful Tire-Shrinker, of which the following is a specification.

This invention relates to devices for shrinking tires while cold upon wheels, more particularly vehicle-wheels, and has for its object to improve the construction and produce a device of this character simple in operation, easily applied, and by means of which an increased force may be applied without increase of expense or complication of parts.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a side elevation, and Fig. 2 is an enlarged plan view, of the device applied. Fig. 3 is a longitudinal sectional view. Fig. 4 is a transverse section on the line 4 4 of Fig. 2.

The improved device consists of a flexible member, such as a chain 10, for encircling a tire 11 when upon the wheel 12, the ends of the chain being united by spaced links 13 14, 15 16, pivoted at 17 18 to the chain ends. Between the ends of the member 10 a supporting-frame 19 is disposed, having a central recess 20 and spaced side recesses 22 23, the side recesses for pivotally supporting the inner ends of the links by pivots 24 25 passing through the adjacent walls of the recesses.

The material of the frame between the central recess and the side recesses is extended at 26 to embrace opposite sides of the tire and felly and prevent lateral displacement of the frame.

Within the central recess 20 a block 28 is movably disposed, and extending through the head of the frame 19 is a set-screw 29, bearing upon the block.

The alternate links of the chain member 10 are formed with depending sides 30, which extend upon either side of the tire and effectually prevent lateral displacement of the chain.

At one or more points in the chain member 10 the links will be detachable, as by bolts 31, substituted for the rivets usually employed for connecting the links, so that the chain may be lengthened or shortened to adapt it to wheels of different sizes.

The pivot members 17 18, whereby the links and chains are connected, will preferably be provided with spacers 32 33 to maintain the chains in proper central position relative to the links.

By this simple arrangement it will be obvious that when the improved device is applied to a tire upon a wheel and the set-screw 29 rotated the flexible member will be forcibly drawn around the tire and engage it for its whole length and "shrink" it upon the felly of the wheel and draw its ends into close proximity, the tire being then fastened, as by bolts or rivets.

The device is simple in construction, can be manufactured at small expense, and may be quickly adjusted to any size of wheel and applied and operated by any person without previous skill and without the necessity for heating the tire.

The parts will preferably be of steel and will be proportioned in size to withstand the strains to which they will be subjected.

Having thus described my invention, what I claim is—

1. A device for shrinking tires upon wheels, comprising a flexible member for encircling the tire upon the wheel, a coupling loosely connecting the ends of the flexible member, and means carried by the coupling for engagement with the wheel to force the coupling radially outward and draw the flexible member into engagement with the tire.

2. A device for shrinking tires upon wheels consisting of a flexible member for encircling the tire upon the wheel, links pivotally connected to the ends of the flexible member and to each other, a supporting-frame pivotally connected to said links at their meeting points, and means for forcibly moving said frame and its connected link ends radially of said tire and wheel.

3. A device for shrinking tires upon wheels consisting of a flexible member for encircling the tire upon the wheel, links pivotally connected to the ends of the flexible member and to each other, a supporting-frame pivotally connected to said links at their meeting points, a block movable within said frame radially with respect to the wheel for bearing upon the tire, and a set-screw operating in said frame and bearing upon said block.

4. A device for shrinking tires upon wheels consisting of a flexible member for encircling the tire upon the wheel, a supporting-frame having spaced recesses in which the free ends of said member are pivotally connected, and means carried by said frame for forcibly moving the same radially of the tire and wheel.

5. A device for shrinking tires upon wheels consisting of a flexible member for encircling the tire upon the wheel, a supporting-frame having spaced recesses in which the free ends of said members are pivotally connected, and with a central recess, a block working in said recess, and a set-screw operating in said frame and bearing upon said block.

6. A device for shrinking tires upon wheels consisting of a flexible member for encircling the tire upon the wheel, a supporting-frame having spaced recesses in which the free ends of said member are pivotally connected, and with a central recess having its walls depending to form guides upon the opposite sides of the tire, a block working in the central recess and wheel-felly, and a set-screw operating through said frame for bearing upon said block.

7. A device for shrinking tires upon wheels consisting of a chain having links formed with spaced projecting sides for engaging opposite sides of the tire and felly, and means connected to the ends of the chain for forcibly moving the free ends of said chain toward each other.

In testimony that I claim the foregoing as my own I have hereto affixed my signature in the presence of two witnesses.

JOHN G. SHUSTER.

Witnesses:
T. THOS. BURK,
A. P. HOLLAND.